3,511,897
GRAFT COPOLYMERS OF AN AZIRIDINE MONO-
MER ON AN ALPHA-OLEFIN COPOLYMER SUB-
STRATE
Donald J. Endsley, Clute, Tex., assignor to The Dow
Chemical Company, Midland, Mich., a corporation of
Delaware
No Drawing. Filed Feb. 5, 1965, Ser. No. 430,746
Int. Cl. C08f 37/04, 37/08
U.S. Cl. 260—878    8 Claims

ABSTRACT OF THE DISCLOSURE

An adhesive composition comprising an olefin copolymer substrate having grafted and polymerized thereon an aziridine monomer. The compositions are useful to make laminates or shaped articles.

---

The present invention relates to polymeric coating materials and more particularly to coating compositions having improved adhesion to a variety of substrates comprised of graft copolymers of an aziridine monomer polymerized on an olefin copolymer substrate.

Olefin polymers as is well known, commonly have smooth and sleek, relatively slippery and wax-like surfaces which are poorly adapted to provide for suitable adhesion or anchorage of applied materials by mere physical attachment. In addition, the relatively inert chemical nature of these polymers resists the efficient attachment of most materials by chemical interlinkage or bonding. Because of the poor bonding properties of these polymers, much difficulty has been encountered in laminating the polymers to substrates such as paper, metals such as steel and aluminum, poly(ethylene terephthalate), and the like.

According to the present invention, olefin copolymers having improved adhesion to diverse substrates are obtained by contacting the olefin copolymer with an aziridine monomer and then polymerizing the said monomer in contact with the copolymer at a temperature between about 20° C. to about 90° C. until the aziridine monomer is graft copolymerized on the olefin copolymer.

The graft copolymer compositions of the present invention may be theoretically represented in the following manner:

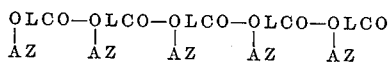

wherein the interlinked "OLCO" symbols represent the olefin copolymer substrate or trunk and the symbols "AZ" connected thereto represent the substituent graft copolymer branches of the aziridine monomer provided thereon. It is, of course, understood that the above formula is ideal or theoretical and that in practice, the units are not necessarily identically repeated, i.e., random distribution can occur.

The olefin copolymer materials that are contemplated as being adapted for utilization as substrates in the practice of the present invention are the solid copolymers obtained by known procedures by polymerizing, (a) at least 50 percent by weight of an alpha olefin having 2 to 10 carbon atoms and
(b) at least one other polymerizable compound selected from (1) an α,β-ethylenically unsaturated monocarboxylic acid having 3 to 7 carbon atoms, (2) an alkyl ester of the acid (1) wherein the alkyl portion contains from 1 to 8 carbon atoms and
(3) a vinyl ester of a monocarboxylic acid.

Preferably the olefin copolymers of the present invention contain from about 70 to about 99.8 percent by weight of the alpha olefin component and about 0.2 to about 30 percent by weight of the other polymerizable compound and more desirably the olefin copolymer contains about 90 to about 99 percent by weight of the alpha olefin component and about 1 to about 10 percent by weight of the other polymerizable compound.

Typical examples of alpha olefins which may be used to prepare the olefin copolymer substrates of the present invention include ethylene, propylene, butene-1, pentene-1, heptene-1, 3-methylbutene-1, 4-methylpentene-1, octene-1 and the like.

Representative examples of α,β-monoethylenically unsaturated monocarboxylic acids which may be copolymerized with the alpha olefins to prepare the olefin copolymer substrates of the present invention include acrylic acid, methacrylic acid, ethacrylic acid, crotonic acid, isocrotonic acid, tiglic acid and angelic acid. Among these, acrylic acid is preferred.

Suitable examples of alkyl esters of the α,β-monoethylenically unsaturated monocarboxylic acids which may be copolymerized with the alpha olefins to prepare the olefin copolymer substrates of the present invention include methyl acrylate, methyl methacrylate, ethyl acrylate, ethyl methacrylate, propyl acrylate, isobutyl acrylate, cyclopentyl acrylate and the like.

Typical examples of vinyl esters of monocarboxylic acids which may be copolymerized with the alpha olefins to prepare the olefin copolymer substrates of the present invention include vinyl acetate, vinyl propionate, vinyl butyrate, vinyl isobutyrate, vinyl octoate, vinyl cyclopentonate, vinyl benzoate and the like.

The olefin copolymers employed in the process of the present invention are random copolymers and can be prepared by known methods as for example by heating a mixture of the comonomers under a pressure of about 50 to about 3,000 atmospheres and elevated temperatures in the range of 150° to 300° C. in the presence of a suitable free radical catalyst such as lauroyl peroxide, ditertiary butyl peroxide and α,α-azobisisobutyronitrile.

It is usually beneficial for the graft copolymer compositions of the present invention to contain a major portion of the olefin polymer trunk or substrate that has been modified with the substituent aziridine graft copolymer groups chemically attached thereto. As a general rule, it is desirable for the graft copolymer to be comprised of at least 80 percent by weight of the olefin copolymer substrate, and it is preferred that the graft copolymer composition be comprised of between about 92 to about 98 percent by weight of the olefin copolymer substrate.

The aziridine monomers which are utilized to modify the olefin copolymer substrates so as to provide the graft copolymer composition of the present invention are represented by the formula

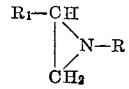

wherein R is hydrogen, an hydroxyalkyl radical containing 1 to 4 carbon atoms or an aminoalkyl radical containing 1 to 4 carbon atoms and $R_1$ is hydrogen or an alkyl group containing 1 to 4 carbon atoms.

Suitable examples of aziridine monomers which may be graft polymerized on the olefin copolymer substrate include ethylenimine, alkyl substituted ethylenimines such as 2-methyl-ethylenimine, 2-propyl-ethylenimine, 2-butyl-ethylenimine, N-substituted hydroxyalkyl or aminoalkyl ethylenimines such as N-(2-hydroxyethyl)ethylenimine, N - (2 - hydroxypropyl)ethylenimine, N-(2-aminoethyl) ethylenimine, N - (2 - aminopropyl)ethylenimine, N - (2-aminobutyl)ethylenimine and the like.

The graft copolymers of the present invention are prepared by contacting the olefin copolymer substrate with the aziridine monomer in any desired manner. The olefin copolymer can be contacted with the monomer by spraying, dipping, washing or by condensing monomer vapors on the olefin copolymer substrate. Thus the aziridine monomer may be heated to elevated temperatures i.e. about 25° C. to about its boiling point and directly applied to the olefin polymer substrate, or it may be applied from dispersion or solution in suitable liquid vehicles. Ordinarily, it is advantageous for the aziridine monomer to be diluted in a solvent or dispersant vehicle so as to provide a treating bath in which the olefin copolymer substrate may be immersed and then heating the vehicle to a temperature of from about 25° C. to the degradation temperature of the olefin copolymer for a sufficient period of time to attain the desired graft copolymer content adequate for the intended purpose. The treating solution is preferably maintained at a temperature of about 60° to about 90° C. for periods of time ranging up to 8 or more hours. The ratio of reactants ranges from about 0.05 to about 12 parts of the aziridine monomer to each part of the olefin copolymer. While amounts in excess of those specified may be employed, no substantial improvement in the properties of the graft copolymer are observed.

The olefin copolymer substrate may be treated in any fabricated or unfabricated form. Advantageously, the aziridine monomer may be graft polymerized on the olefin copolymer substrate when the substrate is in the form of an already shaped article such as a film sheet.

Unfabricated graft copolymer compositions in accordance with the present invention may be used as the cohesive ingredient in the preparation of laminates or they may be heat formed into shaped articles such as films, tubes, rods, sheets, tapes, ribbons and similar shaped forms, by any desired technique adapted for such purpose with conventional polymers such as molding, extrusion and the like. The articles so formed can be used for waterproofing purposes, electrical insulation and protection from corrosion and chemical attack. The films can be laminated to diverse surfaces such as paper, glass, cellophane and particularly aluminum and poly(ethylene terephthalate) by heat and pressure. Laminates so prepared are extremely resistant to delamination and are superior to laminates similarly prepared from the unmodified olefin copolymer.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE 1

Into a reaction vessel equipped with a means for stirring, temperature control, refluxing, reactant addition and purging were added 705 grams isopropanol, 50 grams of water and 700 grams of pelletized ethylene/acrylic acid copolymer having an acrylic acid content of 8 percent by weight and a melt index of 6 decigrams/minute (according to ASTM D1238–57T). The temperature of the reaction vessel was raised to 76° C. and 49 grams of N-(2-hydroxyethyl)ethylenimine dissolved in 39 grams of isopropanol was added over a 1 hour time period. At the end of this period, the reactants were digested for 8 hours at 76° C. and then cooled to room temperature. The pellets were water washed and dried in warm air at 40–45° C.

A plastic film laminate was prepared by evenly distributing about 100 grams of the graft copolymer product prepared above between a layer of poly(ethylene terephthalate) film sheet 8 inches long x 5 inches wide x 0.003 inch thick and a similar sized sheet of 0.007 inch thick aluminum sheet and pressing the sheets together in a platen press at 350° F. and 40,000 p.s.i. pressure for 1.5 minutes.

The adhesion of the laminate plies was tested by cutting the laminate into 1 inch strips and then pulling the plies apart on a Tinius Olsen commercial tester at a crosshead speed of 2 inches/minute. The force required to separate the two plies was 4.8 lbs./inch, said force being taken as a measure of adhesion.

By way of contrast a laminate prepared using the unmodified ethylene/acrylic acid copolymer as the intermediate layer following the above described laminating procedure required less than 1 lb./inch to separate the laminate plies.

A metal laminate was prepared by evenly distributing about 100 grams of the graft copolymer prepared above between two aluminum sheets, 8 inches long x 5 inches wide x 0.007 inch thick and pressing the aluminum sheets together in a platen press at 350° F. for 1.5 minutes at 40,000 p.s.i. The adhesion of the laminate plies was tested by cutting the laminate into 1 inch strips and then pulling the plies apart on a Tinius Olsen commercial tester at a crosshead speed of 2 inches/minute. The force required to separate the two aluminum sheets was 31.7 lbs./in.

By way of contrast, an aluminum laminate prepared using the unmodified ethylene/acrylic acid copolymer as the intermediate layer, following the above laminating procedure required 14 lbs./in. to separate the aluminum sheets.

EXAMPLE 2

The procedure of Example 1 was repeated with the following recipe:

| Reaction components: | Amount (grams) |
| --- | --- |
| Ethylene/acrylic acid copolymer (8% acrylic acid by weight, melt index=6 decig./min.) | 700 |
| Isopropanol | 590 |
| Water | 60 |
| N-(2-aminoethyl)ethylenimine | 49 |

Temperature of addition of the N-(2-aminoethyl)ethylenimine was 76° C. for 1 hour addition time. The reactants were digested for 8 hours at 76° C. and then cooled. The graft copolymer product was water washed and dried in warm air at 40–45° C.

A poly(ethylene terephthalate)-aluminum laminate was prepared using the above prepared graft copolymer product as the intermediate layer following the procedure of Example 1, laminating conditions employed being 350° F. for 1.5 minutes at 40,000 p.s.i. The force required on the Tinius Olsen tester to separate the laminate plies was 6 lbs./in.

An aluminum laminate was prepared using the graft copolymer product prepared above as the intermediate layer following the procedure of Example 1, laminating conditions employed being 350° F. for 1.5 minutes at 40,000 p.s.i. The force required on the Tinius Olsen tester to separate the aluminum laminate plies was 16 lbs./in.

EXAMPLE 3

The procedure of Example 1 was repeated with the following recipe:

| Reaction components: | Amount |
| --- | --- |
| Ethylene/acrylic acid copolymer (8% by weight acrylic acid melt index=6 decig./min.) | grams__ 150 |
| Toluene | milliliters__ 500 |
| Ethylenimine | grams__ 185 |

Temperature of addition of ethylenimine was 85° C. for 1 hour addition time. The reactants were digested at 72° C. for 8 hours. At the end of this period, a vacuum was placed on the reaction vessel and the unreacted ethylenimine removed. The graft copolymer product was washed with water and dried at 25° C.

A poly-ethylene terephthalate)-aluminum laminate was prepared following the procedure of Example 1, laminating conditions employed being 350° F. at 10,000 p.s.i. for 2 minutes. When attempts were made to strip the laminate plies apart for adhesion testing purposes, it was found to be impossible without destroying the sample, i.e., the poly(ethylene terephthalate) sheet tore before the adhesive bond failed on testing.

EXAMPLE 4

Reaction components: Amount (grams)
Ethylene (68% by weight)/ethyl acrylate (24% by weight)/acrylic acid (8% by weight) terpolymer (melt index=23 decig./min.) _____ 700
Isopropanol _____ 471
Water _____ 300
Ethylenimine _____ 50

Temperature of addition of the ethylenimine was 65° C. for a 10 minute addition time. The reactants were digested for 8 hours at 66–68° C. and then cooled. The graft copolymer product was water washed and dried at 45° C.

A poly(ethylene terephthalate)-aluminum laminate was prepared using the above prepared graft copolymer as in the intermediate layer following the procedure of Example 1, laminating conditions employed being 350° F. for 1.5 minutes at 40,000 p.s.i. The force required to separate the laminate plies was 35 lbs./in. on the Tinius Olsen tester.

By the way of contrast a poly(ethylene terephthalate)-aluminum laminate prepared using the unmodified ethylene/acrylate/acrylic acid copolymer as the intermediate layer, following the above laminating procedure required less than 1 lb./in.

An aluminum laminate was prepared following the procedure of Example 1, laminating conditions employed being 350° F. for 1.5 minutes at 40,000 p.s.i. The force required to separate the laminate plies on the Tinius Olsen tester was 70 lbs./in.

By way of contrast, an aluminum laminate prepared using the unmodified ethylene/ethyl acrylate-acrylic acid terpolymer as the intermediate layer, following the above laminating procedure required 25 lbs./in. to separate the aluminum laminate.

EXAMPLE 5

The procedure of Example 1 was repeated with the following recipe:
Reaction components: Amount (lbs.)
Ethylene/vinyl acetate copolymer (20% by weight vinyl acetate, melt index=19 decig./min.) _____ 30
Isopropanol _____ 30
Water _____ 3
Ethylenimine _____ 3

Temperature of addition of the ethylenimine was 85° C. for 10 minute addition time. The reactants were digested at 85° C. for 10 hours. At the end of this period, a vacuum was placed on the reaction vessel and the unreacted ethylenimine removed. The graft copolymer product was washed with water and dried at 45° C.

A poly(ethylene terephathlate)-aluminum laminate was prepared following the procedure of Example 1, laminating conditions employed being 350° F. at 10,000 p.s.i. for 2 minutes. When attempts were made to strip the laminate plies apart for adhesion testing purposes, it was found to be impossible without destroying the sample, i.e., the poly(ethylene terephthlate) sheet tore before the adhesive bond failed on testing.

EXAMPLE 6

Into a reaction vessel equipped with a water cooled condenser was placed a mixture of ethylenimine, isopropanol and water. Into the condenser was placed a film sheet 12 inches long x 3 inches wide x 0.002 inch thick of an ethylene/acrylic acid copolymer (8 percent by weight acrylic acid, melt index 20 decig./min.). The temperature of the reaction vessel was raised until the ethylenimine refluxed in intimate contact with all portions of the film and was maintained thereat for 5 minutes. The film was then water washed and dried at 25° C.

The treated ethylene/acrylic acid copolymer film was placed between 5 inches x 8 inches x 0.003 inch strips of a poly(ethylene terephthalate) film and the poly(ethylene terephthalate) strips were pressed together in a platen press at 350° F. for 1.5 minutes at 30,000 p.s.i. When attempts were made to strip the laminate plies apart for adhesion testing purposes, it was found to be impossible without destroying the sample, i.e., the poly(ethylene terephthlate) sheets tore before the adhesive bond failed on testing.

Results similar to the foregoing may also be obtained when any other of the mentioned varieties of aziridine monomers are utilized in a similar manner in place of those set forth in the above examples and when graft copolymers are prepared with such monomers on other varities of the above mentioned olefin copolymer substrates.

What is claimed is:

1. A solid graft copolymer composition having improved adhesion consisting of
 (1) a random copolymer substrate of
  (a) at least 50 percent by weight of an alpha mono olefin having 2 to 10 carbon atoms and
  (b) at least one other polymerizable compound selected from the group consisting of
   (i) an $\alpha,\beta$-ethylenically unsaturated monocarboxylic acid having 3 to 7 carbon atoms,
   (ii) an alkyl ester of the acid (i) wherein the alkyl portion contains from 1 to 8 carbon atoms, and
   (iii) a vinyl ester of a monocarboxylic acid, said copolymer substrate having a chemically attached thereto, as graft copolymerized substiuents thereon
 (2) a polymerized aziridine monomer, said monomer being represented by the formula

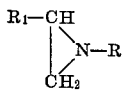

wherein R is selected from the group consisting of hydrogen, hydroxyalkyl radicals containing 1 to 4 carbon atoms, and aminoalkyl radicals containing 1 to 4 carbon atoms and $R_1$ is selected from the group consisting of hydrogen and alkyl groups containing 1 to 4 carbon atoms, said random copolymer substrate constituting at least 80% by weight and the aziridine moiety constituting from 2 to 20% by weight of said solid graft copolymer composition.

2. The composition of claim 1 wherein the olefin copolymer substrate is a copolymer of ethylene and acrylic acid.

3. The composition of claim 1 wherein the olefin copolymer substrate is a copolymer of ethylene and vinyl acetate.

4. The composition of claim 1 wherein the olefin copolymer substrate is a terpolymer of ethylene, ethyl acrylate and acrylic acid.

5. The composition of claim 1 wherein the aziridine monomer is ethylenimine.

6. The composition of claim 1 wherein the aziridine monomer is N-(2-hydroxyethyl)ethylenimine.

7. The composition of claim 1 wherein the aziridine monomer is N-(2-aminoethyl)ethylenimine.

8. A film comprised of the composition set forth in claim 1.

References Cited

UNITED STATES PATENTS

| | | | |
|---|---|---|---|
| 3,113,038 | 12/1963 | Lattarulo et al. | 117—140 |
| 3,154,479 | 10/1964 | Muroi et al. | 204—159.14 |
| 3,115,418 | 12/1963 | Magat et al. | |
| 3,205,156 | 9/1965 | Atarashi | 204—159.14 |
| 3,280,218 | 10/1966 | Endsley et al. | |
| 3,290,416 | 12/1966 | Christenson et al. | |
| 3,365,519 | 1/1968 | Endsley. | |

ROBERT F. BURNETT, Primary Examiner

R. J. ROCHE, Assistant Examiner

U.S. Cl. X.R.

156—331, 332; 161—219, 231; 260—885